US011113117B2

(12) United States Patent
Jha et al.

(10) Patent No.: US 11,113,117 B2
(45) Date of Patent: Sep. 7, 2021

(54) CLUSTERING ROUTINES FOR EXTRAPOLATING COMPUTING RESOURCE METRICS

(71) Applicant: VMware, Inc., Palo Alto, CA (US)

(72) Inventors: Chandrashekhar Jha, Bangalore (IN); Kumar Gaurav, Bangalore (IN); Jobin George, Bangalore (IN); Jusvinder Singh, Bangalore (IN); Naveen Mudnal, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 253 days.

(21) Appl. No.: 16/000,052

(22) Filed: Jun. 5, 2018

(65) Prior Publication Data

US 2019/0370078 A1 Dec. 5, 2019

(51) Int. Cl.
*G06F 15/173* (2006.01)
*G06F 9/50* (2006.01)
*G06K 9/62* (2006.01)

(52) U.S. Cl.
CPC .......... *G06F 9/5072* (2013.01); *G06F 9/5077* (2013.01); *G06K 9/628* (2013.01); *G06K 9/6223* (2013.01)

(58) Field of Classification Search
CPC ...... G06F 9/5072; G06F 9/5077; G06F 9/628; G06F 9/6223
See application file for complete search history.

(56) References Cited

U.S. PATENT DOCUMENTS

| 5,193,152 A | * | 3/1993 | Smith | H04L 41/00 709/220 |
|---|---|---|---|---|
| 10,547,521 B1 | * | 1/2020 | Roy | H04L 43/0817 |
| 2012/0077178 A1 | * | 3/2012 | Bagchi | G09B 7/00 434/362 |
| 2016/0043962 A1 | * | 2/2016 | Kim | H04W 4/08 709/224 |
| 2016/0292578 A1 | * | 10/2016 | Ashenfelter | G06F 16/248 |
| 2017/0024827 A1 | * | 1/2017 | McGill | G06Q 40/08 |

OTHER PUBLICATIONS https://home.deib.polimi.it/matteucc/Clustering/tutorial_html/kmeans.html; Last accessed Aug. 14, 2018.
http://papers.nips.cc/paper/2526-teaming-the-k-in-k-means.pdf; Last accessed Aug. 14, 2018.

* cited by examiner

*Primary Examiner* — Hua Fan
(74) *Attorney, Agent, or Firm* — Thomas | Horstemeyer, LLP (57) ABSTRACT

Various examples are disclosed for using clustering routines to extrapolate metrics to other computing resources in a cluster. One or more computing devices can classify computing resources, such as servers, based on various characteristics of the computing resources. For each class of computing resource, a clustering routine can be applied to generate clusters of the computing resources. A minimal number of metrics required to be obtained from an end user can be determined as a function of a number of the clusters. If one or more of the metrics are obtained from the end user, the metrics can be extrapolated to other computing resources in the same cluster.

20 Claims, 7 Drawing Sheets

CLUSTERING ROUTINES FOR EXTRAPOLATING COMPUTING RESOURCE METRICS

BACKGROUND

Data centers include various physical and virtual components that, when executed, provide web service application programming interfaces, cloud computing environments, virtualization environments, as well as other computing systems. For instance, computer virtualization relates to the creation of a virtualized version of a physical device, such as a server, a storage device, a central processing unit (CPU), a graphics processing unit (GPU), or other computing resources. Data centers can also include virtual machines (VMs), which include emulations of a computer system that can be customized to include a predefined amount of random access memory (RAM), hard drive storage space, as well as other computing resources that emulate a physical machine. Operating a data center can involve maintaining hundreds to thousands of CPUs, GPUs, and other physical hardware, as well as corresponding software.

The Gaussian-means (G-means) and k-means clustering routines are center-based computing methods commonly employed in computer science for cluster analysis. Clustering relates to the process of grouping together a set of objects in such a way that objects in a same group, referred to as a cluster, are more similar to one another, as opposed to objects in other clusters. In computational complexity theory, the G-means and k-means clustering routines are non-deterministic polynomial-time hard (NP-hard) routines or, in other words, are computationally difficult.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to employing clustering routines to extrapolate metrics for computing resources. The extrapolation of metrics can be used to improve the accuracy of metrics shown to personnel pertaining to the operation of a data center or similar computing environment. In some examples, metrics for computing resources can include cost metrics describing a cost of maintaining or operating a data center or other computing system. Some cloud management platforms, such as vRealize Business for cloud (vRBC) by VMware®, provide cloud cost analysis services, consumption metering services, and cloud comparison and planning services. The cloud management platforms thus enable information technology (IT) personnel and others to understand computing costs such that data center spending can be managed and optimized. Additionally, the efficiency of computing resources can be evaluated across data centers, private cloud environments, public cloud environments, hybrid cloud environments, as well as other computing environments.

Generating an accurate cost metric for a data center or other computing system can require an end user to provide purchase costs for each of the computing resources. For instance, to generate an accurate cost for a cloud computing environment, a cloud management platform may require the end user to manually specify server hardware purchase costs. As some cloud computing environments include hundreds to thousands of servers (as well as other physical computing resources requiring purchase), it becomes problematic for the end user to manually enter purchase costs for each server.

While some reference libraries include standard purchase costs for some computing resources, the reference libraries do not account for many factors that are common in actual purchase costs. For instance, the reference libraries might not take into account discounts when servers or other computing resources are purchased in volume as well as prearranged vendor discounts. Alternatively, some cloud management platforms provide an interface for an end user to upload a document, such as a spreadsheet, that includes purchase costs for computer hardware. However, the spreadsheets are commonly incompatible with the cloud management platform and may lead to inaccurate cost estimates due to various permutations and combinations of server configurations. As such, many end users of cloud management platforms are not updating an actual purchase price for computing resources utilized in a data center. Thus, the cloud management systems are providing end users with inaccurate cost metrics.

Accordingly, in various examples described herein, to generate an accurate cost for a computing environment maintained by an entity, such as a data center, a computing environment can apply one or more clustering routines that group computing resources having similar configuration parameters together to form one or more clusters. A cost metric for one of the computing resources in the cluster can be extrapolated to other computing resources in the same cluster, thereby lessening an amount of inputs required to provide an accurate cost metric or other metric describing the operation of a computing system. In some examples, inputs required for hundreds to thousands of servers can be reduced to five values while providing an overall cost metric having a predetermined degree of accuracy above a suitable threshold, such as 90%.

Further, the computing environment can determine a minimalistic list of computing resources that, if additional information were obtained from an end user, could be extrapolated to determine a more accurate actual cost for a data center or other computing system. In some example, a request can be sent to a device associated with an end user, for example, to obtain costs or other metrics for each of the servers in the list. If the costs or other metrics are obtained, the metrics can be extrapolated for other servers not included in the minimalistic list.

The examples described herein thus improve the functioning of a computing system, namely, those that provide metrics pertaining to the operation of a data center, by improving the accuracy of those metrics. While some examples described herein relate to determining a cost metric, the computing environment described herein does not merely perform a financial method. Instead, the examples described herein relate to a computing environment that performs clustering routines to extrapolate metrics while obtaining a desired degree of accuracy for those metrics. As a result, the computing environment management service can provide entities with more accurate computing cost metrics associated with buying or operating computing resources, such as server hardware.

Figure 1:
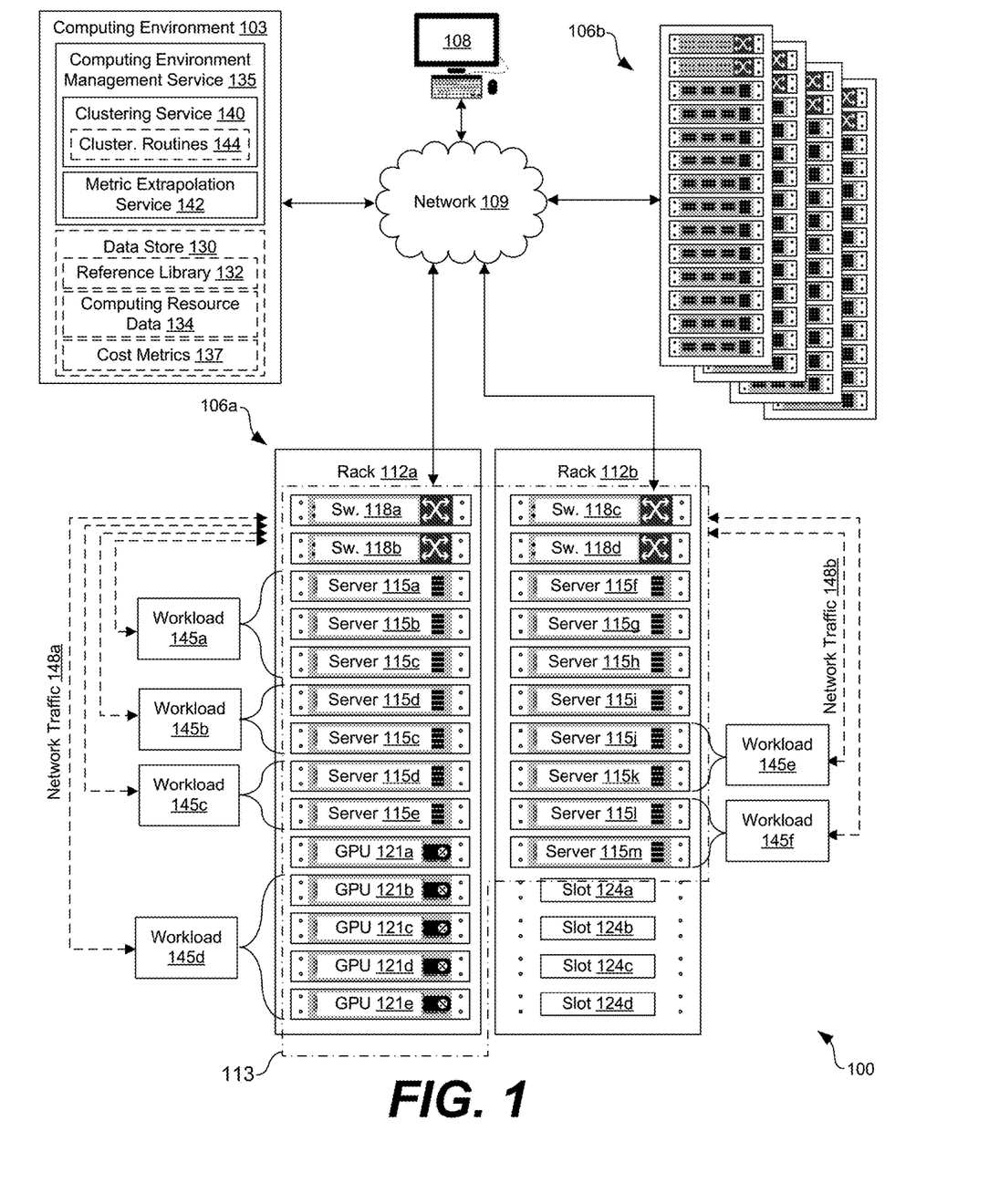
FIG. 1 is a drawing of an example of a networked computing environment having a computing environment management service configured to extrapolate metrics for computing resources.

With reference to FIG. 1, an example of a networked environment 100 is shown. The networked environment 100 can include a computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks.

For example, the networks can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

In various embodiments, the computing systems 106 can include a plurality of devices installed in racks 112 which can make up a server bank, aggregate computing system, or a computer bank in a data center or other like facility. In some examples, the computing systems 106 can include high-availability computing systems. A high-availability computing system is a group of computing devices that act as a single system and provides a continuous uptime. The devices in the computing systems 106 can include any number of physical machines, virtual machines, virtual appliances, and software, such as operating systems, drivers, hypervisors, scripts, and applications.

In some examples, a computing environment 103 can include an enterprise computing environment that includes hundreds or even thousands of physical machines, virtual machines, and other software implemented in devices stored in racks 112, distributed geographically and connected to one another through the network 109. It is understood that any virtual machine or virtual appliance is implemented using at least one physical device, such as a server.

The devices in the racks 112 can include various computing resources 113. The computing resources 113 can include, for example, physical computing hardware, such as memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage virtualization infrastructure or a cloud computing environment. In some examples, the computing resources 113 can also include virtual computing resources, such as virtual machines or other software.

In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112. Additionally, if a server 115 includes an instance of a virtual machine, the server 115 can be referred to as a "host," while the virtual machine can be referred to as a "guest."

Each server 115 that acts as a host in the networked environment 100, and thereby includes one or more guest virtual machines, can also include a hypervisor. In some examples, the hypervisor can be installed on a server 115 to support a virtual machine execution space within which one or more virtual machines can be concurrently instantiated and executed. In some examples, the hypervisor can include the ESX™ hypervisor by VMware®, the ESXi™ hypervisor by VMware®, or similar hypervisor. It is understood that the computing systems 106 are scalable, meaning that the computing systems 106 in the networked environment 100 can be scaled dynamically to include additional servers 115, switches 118, GPUs 121, power sources, and other components, without degrading performance of the virtualization or cloud computing environment.

In various examples, when a host, such as a physical server, is added to a computing system 106, an agent application can be uploaded to the host and configured to communicate with other agent applications in the computing system 106. Some of the hosts in the computing system 106 can be designated as primary hosts, and other hosts in the computing system 106 can be designated as secondary hosts. The primary hosts, for example, can maintain and replicate states of the computing system 106 and can be used to initiate failover actions. Any host that joins the computing system 106 can communicate with a host, such as an existing primary host, to complete its configuration.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing systems 106, it is understood that in some examples the computing systems 106 can be a portion of the computing environment 103.

The computing environment 103 can include or be operated as one or more virtualized computer instances in some examples. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 108 for end users over the network 109, sometimes remotely, the computing environment 103 can be described as a remote computing environment 103 in some examples. Additionally, in various examples, the computing environment 103 can be implemented in servers 115 of a rack 112 and can manage operations of a virtualized or cloud computing environment. Hence, in some examples, the computing environment 103 can be referred to as a management cluster in the computing systems 106.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. For instance, the data store 130 can include one or more relational databases, such as structure query language (SQL) databases, non-SQL databases, or other relational or non-relational databases. The data stored in the data store 130, for example, can be associated with the operation of the various services or functional entities described below.

The data store 130 can include a database or other memory that includes, for example, reference libraries 132 and computing resource data 134. Reference libraries 132 can include a database having default or standardized metrics for computing resources. For instance, the reference libraries 132 can include default cost metrics for various computing resources. In one example, the reference libraries 132 can include initial purchase costs for servers or other computing resources. As noted above, in some scenarios, the initial purchase costs are inaccurate as they fail to account for potential discounts or other factors that affect the initial purchase costs. Accordingly, in some examples, a computing environment management service 135 can be used to update and improve the accuracy of cost metrics and other data included in the reference libraries 132.

Computing resource data 134 can include information pertaining to the computing resources of the computing systems 106 or other computing resources of the networked environment 100. For example, a list of servers 115, switches 118, GPUs 121, or other computing resources can be maintained in the computing resources data 134. Additional information pertaining to those computing resources can also be stored, such as manufacturer data, model data, version data, vendor data, purchase date, as well as configuration parameters pertaining to the computing resources. Configuration parameters for a server 115 can include, for example, the types or models of central processing units (CPUs) of the server 115; a size of a random access memory (RAM) of the server 115; a central processing unit (CPU) model of the server 115; a number of network interface controller (NIC) cards of the server 115, as well as other parameters.

The components executed on the computing environment 103 can include, for example, a computing environment management service 135 as well as other applications, services, processes, systems, engines, or functionality not discussed in detail herein. The computing environment management service 135 can be executed to oversee the operation of the networked environment 100 through management of the computing systems 106 as well as the physical and virtual computing resources that make up the computing systems 106. In some examples, an enterprise, organization, or other entity, can operate the computing environment management service 135 to oversee or manage the operation of devices in the racks 112, such as servers 115, switches 118, GPUs 121, power supplies, cooling systems, and other components.

Additionally, in some examples, the computing environment management service 135 can present various metrics associated with a past, current, or future operation of the networked environment 100 and the components therein. For example, the computing environment management service 135 can generate cost metrics 137 describing a past, present, or future operational costs of operating or maintaining the networked environment 100. To this end, the cost metrics 137 can account for initial hardware purchase costs, software licensing costs, electricity costs, facility costs, as well as other costs associated with operating and maintaining the computing systems 106 or other portions of networked environment 100. While cost metrics 137 are described herein, it is understood that the computing environment management service 135 can generate and extrapolate other metrics, such as metrics pertaining to bandwidth, computational efficiency, as well as other metrics.

To generate cost metrics 137 that are more accurate than those found in the reference library 132, the computing environment management service 135 can include a clustering service 140 and a metric extrapolation service 142 in some examples. The clustering service 140 can apply one or more clustering routines 144, such as a Gaussian-means (G-means) clustering routine, a k-means clustering routine, or other clustering routine to analyze a large dataset, such as a large list of computing resources. In some examples, the clustering routines 144 can analyze actual cost metrics 137 for servers 115 or other computing resources. The metric extrapolation service 142 can use actual cost metrics 137 received from an end user, such as IT or business personnel, to extrapolate the actual cost metrics 137 to other servers 115 or computing resources in a same cluster or having a same classification. As a result, the computing environment management service 135 can generate cost metrics 137 for overall computing systems 106, the overall networked environment 100, or portions thereof, that are highly accurate without requiring an end user to specify hundreds to thousands of actual purchase costs for various computing resources in the computing systems 106.

The various physical and virtual components of the computing systems 106 can process workloads 145a . . . 145f. Workloads 145 can refer to the amount of processing that a server 115, switch 118, GPU 121, or other physical or virtual component has been instructed to process or route at a given time. The workloads 145 can be associated with virtual machines, public cloud services, private cloud services, hybrid cloud services, or other software executing on the servers 115. For instance, the workloads 145 can include tasks to be processed to provide employees of an enterprise with remote desktop sessions or other virtualized computing sessions.

The computing environment management service 135 can maintain a listing of active or inactive workloads 145 as well as oversee the assignment of various workloads 145 to various devices in the computing systems 106. For instance, the computing environment management service 135 can assign a workload 145 lacking in available resources to a server 115 that has resources sufficient to handle the workload 145. The workloads 145 can be routed to various servers 115 by the switches 118 as network traffic 148a . . . 148b.

Figure 2:
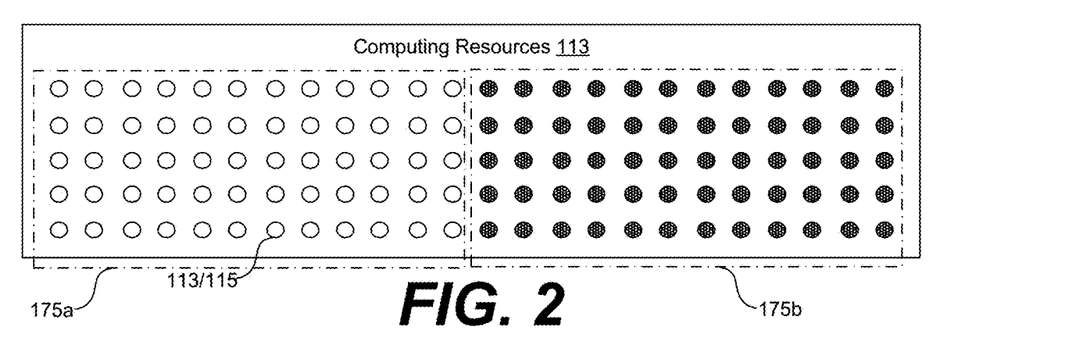
FIGS. 2-4 are drawings illustrating an example of a clustering routine that can be performed by the computing environment management service to extrapolate metrics.

Referring next to FIG. 2, a diagram is shown that illustrates the classification of computing resources 113. For instance, each circle can represent a computing resource 113, such as a server 155. Prior to implementing clustering routines 144, the computing environment 103 can classify computing resources 113. By classifying computing resources 113, the computing environment 103 can generate various classes 175a . . . 175b (collectively "classes 175") of the computing resources 113.

In some examples, the computing environment 103 can classify computing resources 113 based at least in part on a time parameter, a vendor that sold the computing resources 113, a manufacturer of the computing resources 113, or other information. The time parameter can include, for example, a purchase date of the computing resources 113. In examples in which each of the computing resources 113 shown in FIG. 2 includes a server 115, the computing environment 103 can generate classes 175 of the servers 115 based on a manufacturer of the servers 115, a purchase date, as well as other information.

Figure 5:
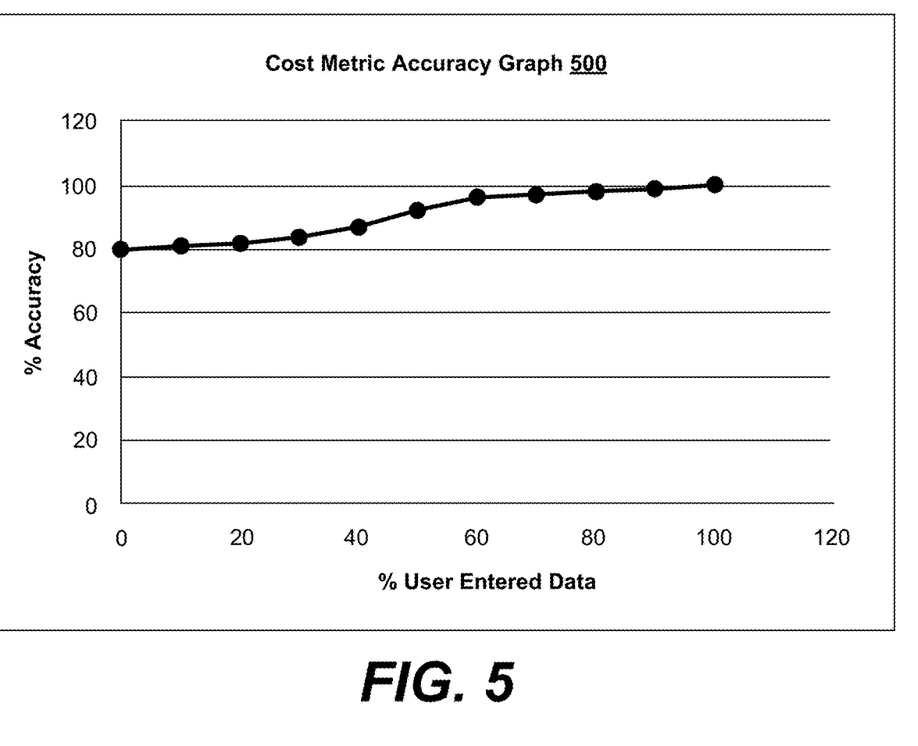
FIG. 5 is a graph illustrating accuracy of metrics.

While merely two classes 175a ... 175b are shown in FIG. 5, it is understood that additional classes 175 can exist depending on the makeup of the server 115 or other computing resources 113 in the computing systems 106. Similarly, in some examples, only a single class 175 may be warranted. In either case, the first class 175a, shown using unshaded circles, can include servers 115 purchased on a common date (May 30, 2018) from a common manufacturer ("AlphaCo"). The first class 175b, shown using shaded circles, can include servers 115 on another date ("Jun. 1, 2019") from a common manufacturer ("BetaCo").

It is understood that it is likely that the servers 115 in the particular classes 175 were purchased as a batch and, thus, are likely to have the same or similar purchase cost metrics 137. In some examples, the computing environment 103 can classify the servers 115 or other computing resources 113 by filtering data using vendor, manufacturer, batch purchase date, as well as other information.

Figure 3:
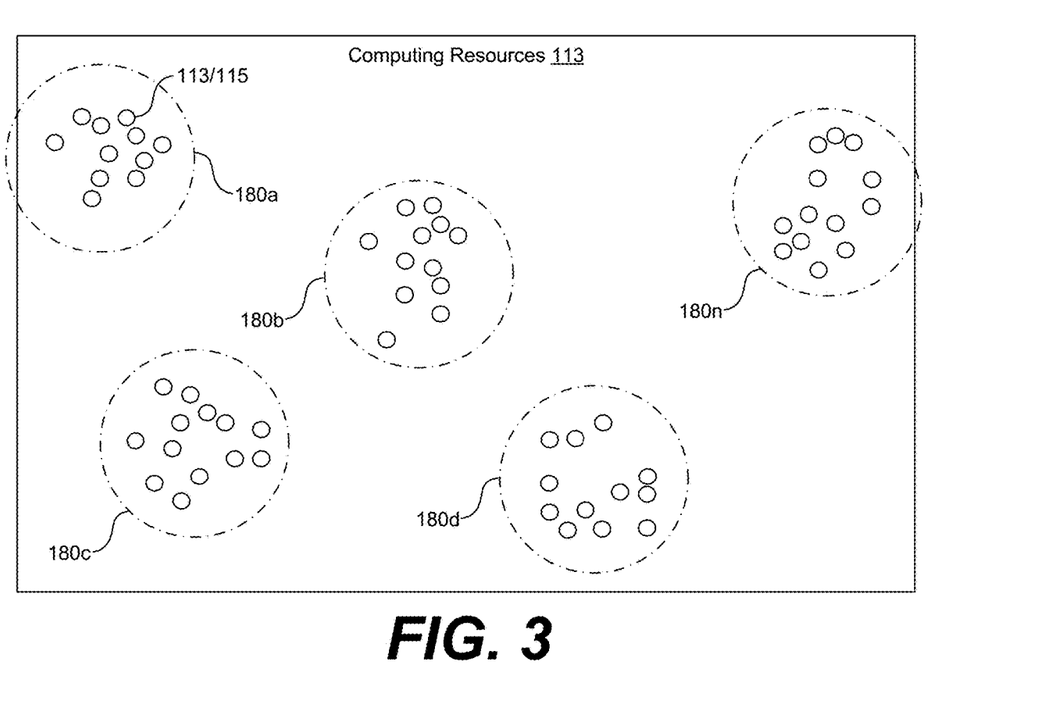

Turning now to FIG. 3, a diagram is shown that illustrates the clustering of computing resources 113 by the computing environment 103. The computing environment 103 can, for individual ones of the classes 175, apply a clustering routine 144 that generates clusters 180a ... 180n of the computing resources 113. As the circles shown in FIG. 3 are unshaded, it is understood that the clusters 180 shown are generated using computing resources 113 in the first class 175a referred to with respect to FIG. 2.

In some examples, the computing environment 103 can cluster the computing resources 113 by grouping together computing resources 113 that have similar configuration parameters. Configuration parameters for a server 115 can include, for example, the types or models of central processing units (CPUs) of the server 115; a size of a random access memory (RAM) of the server 115; a central processing unit (CPU) model of the server 115; and a number of network interface controller (NIC) cards of the server 115, as well as other parameters. As a result, clusters 180 are generated in which servers 115 or other computing resources 113 in the same cluster 180 are more similar to one another, as opposed to computing resources 113 in other clusters 180.

Figure 4:
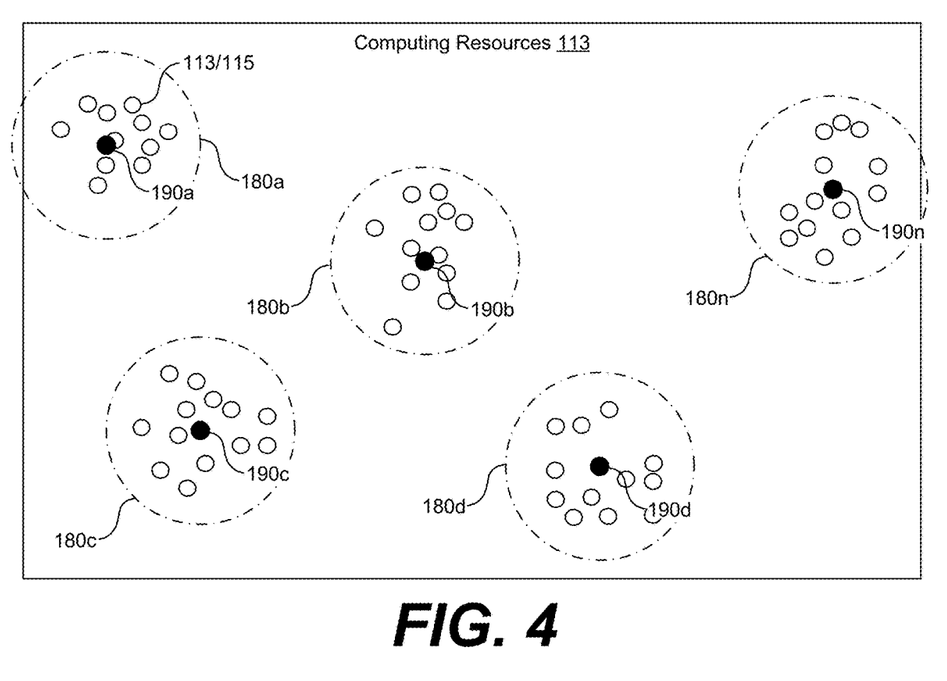

In some examples, the clustering routine 144 can include a center-based clustering algorithm, such as the G-means clustering routine, the k-means clustering routine, or other clustering routine 144. When implementing the G-means clustering routine, the computing environment 103 can start with a small number of k-means centers and grow the number of centers through multiple iterations. While executing of the G-means clustering routine, the computing environment 103 can repeatedly make determinations based on a statistical test for data assigned to each center 190a ... 190n of a cluster 180, as shown in FIG. 4. For instance, if the data currently assigned to a k-means center appear to be Gaussian, then the data can be represented as having only one center 190, as shown in FIG. 4. However, if the data does not appear to be Gaussian, then the computing environment 103 can use multiple centers to model the data with a higher degree of accuracy.

To this end, the computing environment 103 can split a center 190 of a cluster 180 into two centers 190 or, specifically, the centers 190 whose data appear not to come from a Gaussian distribution. In some examples, between each iteration of the G-means routine, the computing environment 103 can execute another clustering routine 144, such as the k-means clustering routine, to refine the current solution. The number of clusters 180 can be referenced using the variable k. Referring to the diagrams shown in FIG. 3 and FIG. 4, the value of k is equal to five as five clusters 180 are shown.

In some examples, the computing environment 103 can run the k-means clustering routine multiple times, for instance, up to k times when finding k centers. As such, the time complexity is at most O(k). The k-means clustering routine assumes that the data points in each cluster 180 are spherically distributed around the center 190. On the other hand, the Gaussian expectation-maximization routine assumes that the data points in each cluster 180 have a multi-dimensional Gaussian distribution with a covariance matrix that may or may not be fixed, or shared.

Referring now to FIG. 5, a cost metric accuracy graph 500 is shown. The computing environment management service 135 can determine a minimalistic list of computing resources 113, such as servers 115, for which the end user is asked for actual cost metrics 137 paid when purchasing the computing resources 113. The computing environment management service 135 ideally increases a percentage of accuracy in cost prediction versus a percentage of metrics specified by an end user, such as cost metrics 137. This data is used to extrapolate the cost of the remaining servers 115 or other computing resources 113 with an accuracy dependent upon how many cost metrics 137 the end user has provided. This is visualized in the cost metric accuracy graph 500 of FIG. 5

For instance, the cost metric accuracy graph 500 includes an axis for a percentage of accuracy ("% Accuracy") versus an axis for a percentage of metrics provided by an end user ("% User Entered Data"). The graph 500 illustrates a saturating curve, with 80% accuracy at 0% data (merely using the reference library 132), while increasing to 100% accuracy with 100% of metrics being provided by end users. In other words, as more data is provided by the end user, the accuracy of the extrapolation of metrics discussed herein will increase. Notably, the increase in percentage is non-linear.

Figure 6:
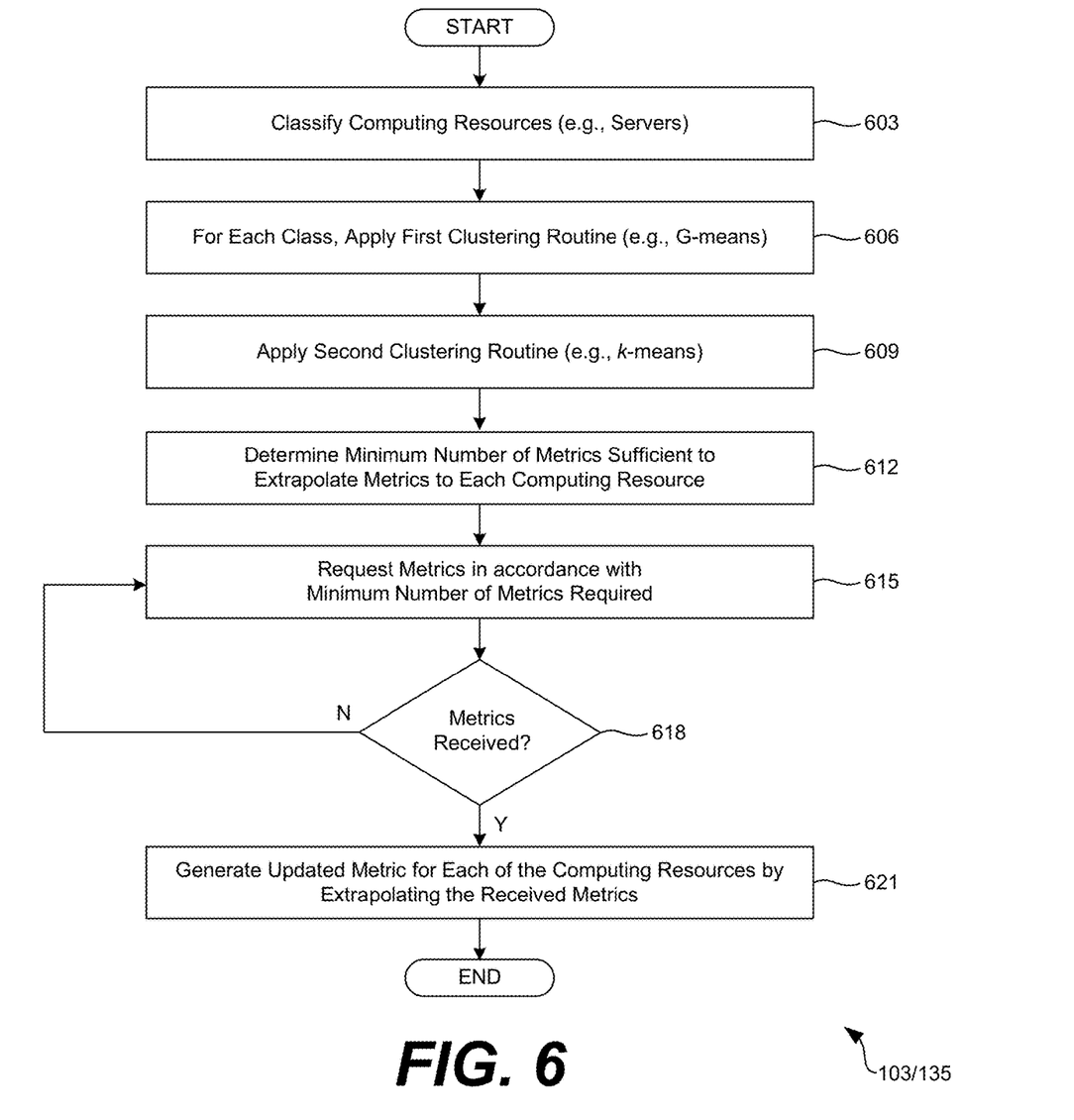
FIGS. 6-8 are flowchart illustrating functionality implemented by components of the networked computing environment of FIG. 1.

Moving on to FIG. 6, shown is a flowchart that provides one example of the operation of a portion of the networked environment 100. The flowchart of FIG. 6 can be viewed as depicting an example of elements of a method implemented by the computing environment management service 135 executing in the computing environment 103 according to one or more examples. The separation or segmentation of functionality as discussed herein is presented for illustrative purposes only.

Beginning with step 603, the computing environment 103 can classify computing resources 113 where classes 175 of the computing resources 113 are generated. In some examples, the computing environment 103 can classify computing resources 113 based at least in part on a time parameter, a manufacturer of the computing resources 113, or other information. The time parameter can include, for example, a purchase date of the computing resources 113. In some examples, the computing resources 113 include servers 115, thus, the computing environment 103 can generate classes of the servers 115 based on a manufacturer of the servers 115, a purchase date, as well as other information. As such, all servers 115 purchased on a common date (May 30, 2018) from a common manufacturer ("AlphaCo") can be placed in one class 175a, all servers 115 purchased on another common date ("Jun. 1, 2019") from a common manufacturer ("BetaCo") can be placed in another class 175b, and so forth. It is understood that it is likely that the servers 115 in the particular classes 175 were purchased as a batch and, thus, are likely to have the same or similar purchase cost metrics 137. In some examples, the computing environment 103 can classify the servers 115 or other computing resources 113 by filtering data using vendor, manufacturer, batch purchase date, as well as other information.

In step 606, the computing environment 103 can, for individual ones of the classes 175, apply a first clustering routine 144 that generates clusters 180 of the computing resources 113. In some examples, the computing environment 103 can apply the first clustering routine 144 based on, for example, a similarity of configuration parameters associated with the computing resources 113. In some examples, the first clustering routine 144 can include the G-means clustering routine. In alternative examples, the first cluster routine 144 can include the k-means clustering routine or other clustering routine 144.

Assume, for instance, that the computing environment 103, in step 606, generates a number of classes 175 (N). For each of the classes 175 (1, 2, . . . , N) obtained in step 603, the computing environment 103 can generate clusters 180 of the servers 155 or other computing resources 113 based at least in part on a similarity of configuration parameters. Configuration parameters for a server 115 can include, for example, central processing units (CPUs) of the server 115; a size of a random access memory (RAM) of the server 115; a central processing unit (CPU) model of the server 115; and a number of network interface controller (NIC) cards of the server 115, as well as other parameters.

In step 609, the computing environment 103 can apply a second clustering routine 144 that refines the clusters 180 of the computing resources 113. For instance, in examples in which the computing environment 103 applies a first clustering routine 144 that includes the G-means clustering routine, the computing environment 103 can apply a k-means clustering routine between iterations. In other words, the computing environment 103, during each iteration of the G-means clustering routine, can split a center 190 into two centers 190 whose data do not come from a Gaussian distribution. Between each round of splitting, the computing environment 103 can apply the k-means routine on the entire dataset and all of the centers 190 to refine the current solution.

In the G-means routine and the k-means routine, a number of clusters 180 is represented by a variable (k). A result of the routine, the computing environment 103 will produce k number of clusters 180. However, it is not always clear what is the best value for k. As such, in some examples, the computing environment 103 can initialize the routine with k=1, thereby producing a single cluster 180 in a first iteration of the clustering routine 144.

However, in additional examples, the computing environment 103 can specify a larger value of k, for instance, if prior knowledge about a range of k is known. In some examples, the prior knowledge can include servers 115 categorized in the following categories: (1) extra small, (2) small, (3) medium, (4) large, and (5) extra-large based on their configuration parameters. As servers 115 can be classified as belonging to one of five groups, in some examples, the computing environment 103 can use k=5 when performing the clustering routine 144.

Next, in step 612, the computing environment 103 can determine a number of cost metrics 137 required for the computing environment 103 to obtain in order to extrapolate the cost metrics 137 to all of the computing resources 113 in a cluster 180. The number of the metrics required can be a function of a number of the clusters 180 generated by the computing environment 103. For instance, assume a number of clusters 180, N, resulted from step 606 and step 609: $k_1$, $k_2$, . . . , $k_N$. Assuming at least one cost metric 137 is required from an end user for each cluster 180 in order to update the reference library 138 for the cluster 180, a minimum number of cost metrics 137 required for complete update of the reference library 132, K, can be determined by:

$$K = \sum_{i=1}^{N} k_i. \qquad \text{(eq. 1)}$$

Therefore, it is ideal to obtain at least K number of cost metrics 137 for servers 115 or other computing resources 113 in order to update the reference library 132 and provide a degree of accuracy exceeding a predetermined threshold, such as 90% or other threshold.

In step 615, the computing environment 103 can request cost metrics 137 based on the minimum number of cost metrics 137 required, as determined in step 612. In some examples, the computing environment 103 can generate one or more user interfaces for transmission to a client device 108 associated with an administrator. The user interface can include textboxes or other similar fields for receiving the cost metric 137, which can be communicated over the network 109 to the computing environment 103. When implemented, the value of K is likely to be much smaller than an actual number of servers 115 or other computing resources 113. For instance, in some examples, for a data center having thousands of servers 115, the end user may only be requested to provide five cost metrics 137.

In step 618, the computing environment 103 can determine whether one or more one or more cost metrics 137, or other metrics, have been received from the client device 108. In some examples, the computing environment 103 can account for situations in which the end user has not provided the K number of cost metrics 137 determined in step 612. To this end, the computing environment 103 can update a subset of K values in the reference library 132. For instance, only those clusters 180 for which a cost metric 137 is obtained will be updated in some examples. The computing environment 103 can utilize the default values in the reference library 132 when estimating costs or other metrics for clusters 180 in which a cost metric 137 has not been received. If at least one cost metric 137 has not been received, the process can revert to step 615 to continue requesting cost metrics 137.

Referring again to step 618, assuming at least one cost metric 137 has been received, the process can proceed to step 621. In step 621, the computing environment 103 can extrapolate the cost metrics 137 received from the client device 108 (or otherwise obtained) to cost metrics 137 for each of the servers 115 or other computing resources 113 in a computing system 106. In other words, using a cost metric 137 received for one of the clusters 180, the computing environment 103 can generate an updated cost metric 137 for other ones of the computing resources 113 in the same class 175 and/or cluster 180.

The extrapolation of the cost metrics 137 is discussed in greater detail below with respect to FIGS. 7 and 8. Thereafter, the process can proceed to completion.

Figure 7:
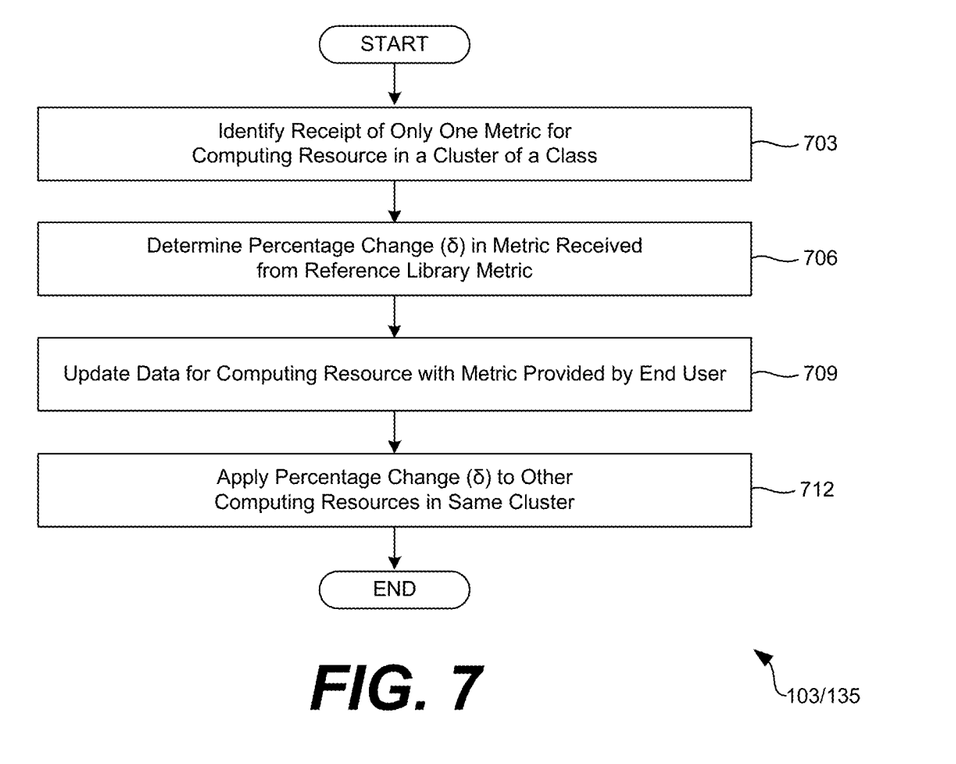

Turning now to FIG. 7, shown is a flowchart that provides one example of the operation of a portion of the networked environment 100. The flowchart of FIG. 7 can be viewed as depicting an example of elements of a method implemented by the computing environment management service 135 executing in the computing environment 103 according to one or more examples. The separation or segmentation of functionality as discussed herein is presented for illustrative purposes only.

It can be desirable to account for situations in which cost metrics 137 are not readily available for purchases of servers 115 or other computing resources. As such, in step 703, the computing environment 103 can identify receipt of only one cost metric 137 for a cluster 180 generated for a class 175. For instance, the computing environment 103 can generate a user interface that requests a minimum number of metrics required to extrapolate metrics to each computing resource 113 while maintaining a predetermined confidence level. In some situations, the end user may only provide a single value in the fields for the cost metrics 137.

Next, in step 706, the computing environment 103 can determine a percentage change (δ) in the cost metric 137 provided by the end user relative to a value from the reference library 132 value for the server 115 or other computing resource 113.

$$\frac{(V_2 - V_1)}{|V_1|} = \delta, \qquad \text{(eq. 2)}$$

where $V_2$ is the value from the reference library 132 and $V_1$ is the cost metric 137 provided from the end user.

In step 709, the computing environment 103 can update the value in the reference library 132 for the particular server 115 or other computing resource 113. For instance, an estimated cost metric 137 stored in the reference library 132 for the AlphaCo ServerX can be updated to an actual cost metric 137 obtained from an end user on a client device 108.

Next, in step 712, the computing environment 103 can apply the percentage change (δ), determined in step 706, to the other servers 115 or computing resources 113 in the same cluster 180. For instance, servers 115 having similar configuration parameters, purchase date, vendor, or manufacturer as the AlphaCo ServerX can be updated as well using the percentage change (δ) determined in step 706. Thereafter, the process can proceed to completion.

Figure 8:
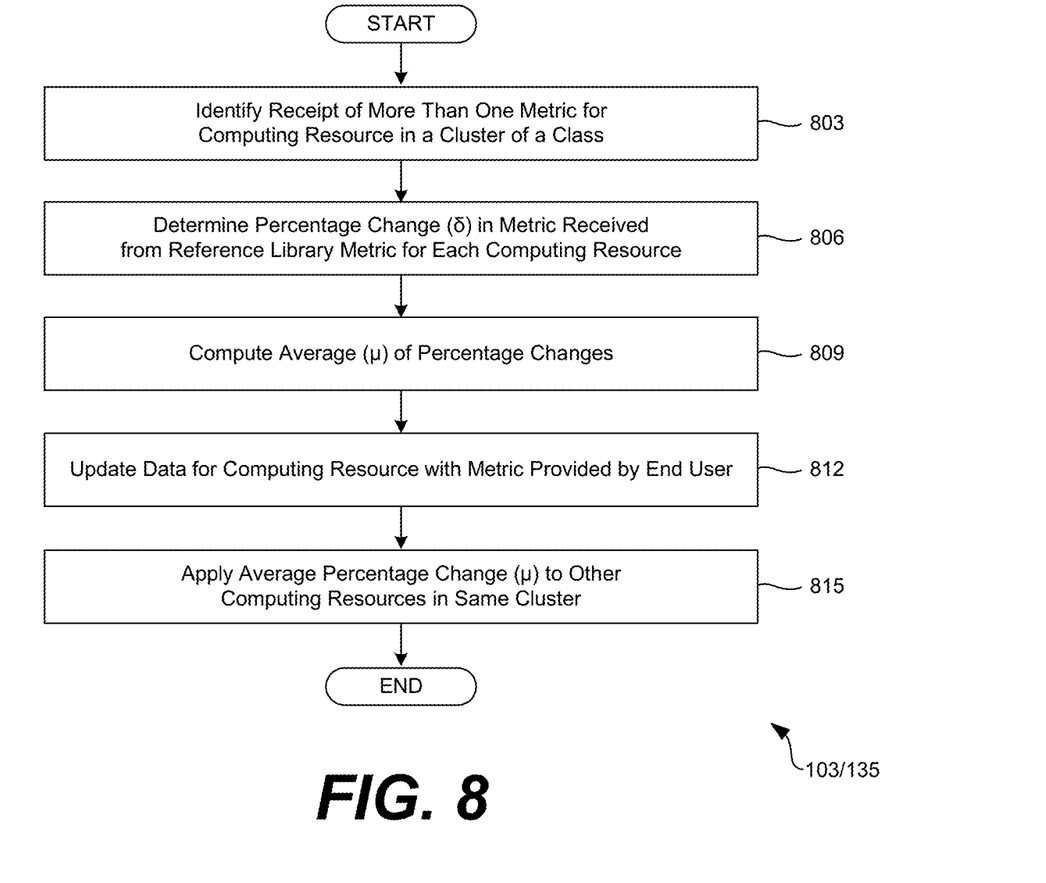

Moving on to FIG. 8, shown is a flowchart that provides one example of the operation of a portion of the networked environment 100. The flowchart of FIG. 8 can be viewed as depicting an example of elements of a method implemented by the computing environment management service 135 executing in the computing environment 103 according to one or more examples. The separation or segmentation of functionality as discussed herein is presented for illustrative purposes only.

While the flowchart of FIG. 7 details a process for accounting for situations in which a single cost metric 137 was obtained for a cluster 180 and class 175, the computing environment 103 can also account for situations in which additional cost metrics 137 are provided for servers 115 or other computing resources 113 in the same cluster 180 and class 175. Accordingly, in step 803, the computing environment 103 can identify receipt of more than one cost metric 137 for a cluster 180 generated for a class 175. For instance, the computing environment 103 can generate a user interface that requests a minimum number of metrics required to extrapolate metrics to each computing resource 113 while maintaining a predetermined confidence level. In some situations, the end user can provide multiple values for servers 115 or other computing resources 113 in the same cluster 180, for instance, to obtain a greater degree of accuracy when estimating costs of operating the computing systems 106 or other portions of the networked environment 100.

Next, in step 806, the computing environment 103 can determine a percentage change (δ) in the cost metric 137 for each of the servers 115 other computing resources 113. In some examples, the percentage change (δ) can be calculated using eq. 2.

Next, in step 809, the computing environment 103 can determine an average (µ) of the percentage change (δ) determined for each of the servers 115 or other computing resources 113 in step 806. In some examples, the average can be calculated by:

$$\mu = \frac{\sum_{i=1}^{n} x_i}{n}, \qquad \text{(eq. 3)}$$

where n is the number of percentage changes (δ) calculated in step 806 and x is the value for each of the percentage changes (δ).

In step 812, the computing environment 103 can update the value in the reference library 132 for the particular server 115 or other computing resource 113. For instance, an estimated cost metric 137 stored in the reference library 132 for the BetaCo ServerXYZ can be updated to an actual cost metric 137 obtained from an end user on a client device 108.

Next, in step 815, the computing environment 103 can apply the average of the percentage changes (µ), determined in step 809, to the other servers 115 or computing resources 113 in the same cluster 180. For instance, servers 115 having similar configuration parameters, purchase date, vendor, or manufacturer as the BetaCo ServerXYZ can be updated as well using the average of the percentage changes (0 determined in step 806. Thereafter, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the computing environment management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the computing environment management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for extrapolating metrics for computing resources of a computing environment, comprising:
   at least one computing device;
   program instructions stored in memory and executable in the at least one computing device that, when executed by the at least one computing device, direct the at least one computing device to:
   generate classes of computing resources based at least in part on a time parameter;
   for individual ones of the classes, generate clusters of the computing resources using a clustering routine, the clusters being generated such that individual ones of the computing resources in a respective one of the clusters have similar configuration parameters with respect to one another;
   determine a number of metrics required to extrapolate the metrics to other ones of the computing resources in a corresponding one of the clusters such that extrapolated metrics generated for the other ones of the computing resources satisfy a predetermined accuracy threshold, the number of metrics determined as a function of a number of the clusters generated;
   receive the number of the metrics from a client device, individual ones of the metrics corresponding to one of the computing resources in one of the clusters;
   determine a difference between respective ones of the number of the metrics as received and a corresponding metric value stored in a reference library;
   determine an average of the difference determined for individual ones of the computing resources; and
   update a corresponding one of the extrapolated metrics generated for other ones of the computing resources in the one of the clusters using the individual ones of the metrics and the corresponding metric value stored in the reference library based at least in part on the average of the difference.

2. The system of claim 1, wherein:

individual ones of the computing resources correspond to a physical server; and the configuration parameters comprise at least one of: a number of central processing units (CPUs); a size of a random access memory (RAM); a central processing unit (CPU) model; and a number of network interface controller (NIC) cards of the physical server.

3. The system of claim 2, wherein:

the time parameter is a date of purchase; and the computing resources are classified based at least in part on a manufacturer of the physical server and the date of purchase.

4. The system of claim 1, wherein:

the clustering routine is a first clustering routine; and the at least one computing device is further directed to apply a second clustering routine after the first clustering routine that refines the clusters of the computing resources, wherein the second clustering routine is applied prior to the number of the metrics required being determined.

5. The system of claim 4, wherein:

the first clustering routine is a Gaussian-means (G-means) clustering routine; and the second clustering routine is a k-means clustering routine.

6. The system of claim 1, wherein the difference is a percentage change, the average is an average of the percentage change for individual ones of the computing resources, and individual ones of the metrics are a cost metric.

7. The system of claim 1, wherein the predetermined accuracy threshold is equal to or greater than 90%.

8. A non-transitory computer-readable medium for extrapolating metrics for computing resources of a computing environment, comprising program code executable in at least one computing device that, when executed by the at least one computing device, directs the at least one computing device to:

generate classes of computing resources based at least in part on a time parameter;

for individual ones of the classes, generate clusters of the computing resources using a clustering routine, the clusters being generated such that individual ones of the computing resources in a respective one of the clusters have similar configuration parameters with respect to one another;

determine a number of metrics required to extrapolate the metrics to other ones of the computing resources in a corresponding one of the clusters such that extrapolated metrics generated for the other ones of the computing resources satisfy a predetermined accuracy threshold, the number of metrics determined as a function of a number of the clusters generated;

receive the number of the metrics from a client device, individual ones of the metrics corresponding to one of the computing resources in one of the clusters;

determine a difference between respective ones of the number of the metrics as received and a corresponding metric value stored in a reference library;

determine an average of the difference determined for individual ones of the computing resources; and update a corresponding one of the extrapolated metrics generated for other ones of the computing resources in the one of the clusters using the individual ones of the metrics and the corresponding metric value stored in the reference library based at least in part on the average of the difference.

9. The non-transitory computer-readable medium of claim 8, wherein:

individual ones of the computing resources correspond to a physical server; and the configuration parameters comprise at least one of: a number of central processing units (CPUs); a size of a random access memory (RAM); a central processing unit (CPU) model; and a number of network interface controller (NIC) cards of the physical server.

10. The non-transitory computer-readable medium of claim 9, wherein:

the time parameter is a date of purchase; and the computing resources are classified based at least in part on a manufacturer of the physical server and the date of purchase.

11. The non-transitory computer-readable medium of claim 8, wherein:

the clustering routine is a first clustering routine; and the at least one computing device is further directed to apply a second clustering routine after the first clustering routine that refines the clusters of the computing resources, wherein the second clustering routine is applied prior to the number of the metrics required being determined.

12. The non-transitory computer-readable medium of claim 11, wherein:

the first clustering routine is a Gaussian-means (G-means) clustering routine; and the second clustering routine is a k-means clustering routine.

13. The non-transitory computer-readable medium of claim 8, wherein the difference is a percentage change, the average is an average of the percentage change for individual ones of the computing resources, individual ones of the metrics are a cost metric, and the predetermined accuracy threshold is equal to or greater than 90%.

14. A computer-implemented method for extrapolating metrics for computing resources of a computing environment, comprising:

generating classes of computing resources based at least in part on a time parameter;

for individual ones of the classes, generating clusters of the computing resources using a clustering routine, the clusters being generated such that individual ones of the computing resources in a respective one of the clusters have similar configuration parameters with respect to one another;

determining a number of metrics required to extrapolate the metrics to other ones of the computing resources in a corresponding one of the clusters such that extrapolated metrics generated for the other ones of the computing resources satisfy a predetermined accuracy threshold, the number of metrics determined as a function of a number of the clusters generated;

receiving the number of the metrics from a client device, individual ones of the metrics corresponding to one of the computing resources in one of the clusters;

determining a difference between respective ones of the number of the metrics as received and a corresponding metric value stored in a reference library;

determining an average of the difference determined for individual ones of the computing resources; and updating a corresponding one of the extrapolated metrics generated for other ones of the computing resources in the one of the clusters using the individual ones of the metrics and the corresponding metric value stored in the reference library based at least in part on the average of the difference.

15. The computer-implemented method of claim 14, wherein:
   individual ones of the computing resources correspond to a physical server; and
   the configuration parameters comprise at least one of: a number of central processing units (CPUs); a size of a random access memory (RAM); a central processing unit (CPU) model; and a number of network interface controller (NIC) cards of the physical server.

16. The computer-implemented method of claim 15, wherein:
   the time parameter is a date of purchase; and
   the computing resources are classified based at least in part on a manufacturer of the physical server and the date of purchase.

17. The computer-implemented method of claim 14, wherein:
   the clustering routine is a first clustering routine; and
   the at least one computing device is further directed to apply a second clustering routine after the first clustering routine that refines the clusters of the computing resources, wherein the second clustering routine is applied prior to the number of the metrics required being determined.

18. The computer-implemented method of claim 17, wherein:
   the first clustering routine is a Gaussian-means (G-means) clustering routine; and
   the second clustering routine is a k-means clustering routine.

19. The computer-implemented method of claim 17, wherein the difference is a percentage change, the average is an average of the percentage change for individual ones of the computing resources, and individual ones of the metrics are a cost metric.

20. The computer-implemented method of claim 17, wherein the predetermined accuracy threshold is equal to or greater than 90%.

* * * * *